United States Patent [19]
Kaufmann

[11] 3,802,816
[45] Apr. 9, 1974

[54] PRODUCTION OF PURE, SPHERICAL POWDERS

[75] Inventor: Albert R. Kaufmann, Lexington, Mass.

[73] Assignee: State Street Bank and Trust Company, Boston, Mass.

[22] Filed: June 22, 1972

[21] Appl. No.: 265,360

Related U.S. Application Data
[62] Division of Ser. No. 55,901, July 17, 1972, abandoned.

[52] U.S. Cl............................ 425/8, 425/6, 264/8
[51] Int. Cl. ........................................... B29c 23/00
[58] Field of Search ................. 425/6, 8; 264/8, 27

[56] References Cited
UNITED STATES PATENTS

| | | | |
|---|---|---|---|
| 2,795,819 | 6/1957 | Lezberg et al. | 425/6 X |
| 3,099,041 | 7/1963 | Kaufmann | 425/8 X |
| 2,897,539 | 8/1959 | McMillan | 425/8 X |

Primary Examiner—Robert L. Spicer, Jr.
Attorney, Agent, or Firm—Cesari and McKenna

[57] ABSTRACT

Generally spherical metallic powder of small size is produced in large quantities by extending a long bar of the material to be processed into a closed chamber through a sealed port, rapidly rotating the bar while striking an arc between it and a stationary electrode to melt portions of the bar and cast off these portions by centrifugal force to form the powder, and axially feeding the bar toward the electrode during consumption to maintain a fixed spark gap. When the bar is nearly fully consumed, it is replaced without opening the chamber simply by aligning a second bar with the unconsumed portion of the first bar and axially advancing this second bar into the chamber through the sealed port. A unique seal capable of withstanding high rotational speeds seals the chamber while a dynamic rest restrains the bar from "whipping."

14 Claims, 7 Drawing Figures

INVENTOR
ALBERT R. KAUFMANN
BY
Cesari and McKenna
ATTORNEYS

INVENTOR
ALBERT R. KAUFMANN
BY
*Cesari and McKenna*
ATTORNEYS

PRODUCTION OF PURE, SPHERICAL POWDERS

RELATED U.S. APPLICATION

This is a division, of application Ser. No. 55,901, filed 7-17-70 now abandoned.

BACKGROUND OF THE INVENTION

A. Field of the Invention

The invention relates to powder making and, more particularly, to a method and apparatus for making generally spherical metallic shot in production quantities.

B. Prior Art

Metallic powders find frequent application throughout the metalworking industry. For example, intricate parts which cannot readily or economically be formed by conventional metalworking processes can frequently be formed quickly and economically by compacting powders of the desired material in a shaped die and sintering the resultant mass. Other applications include the formation of composite materials having preselected engineering characteristics by fully densifying powders of the materials from which the composite is to be formed.

Frequently, these applications require the use of very pure, spherical powders of very small dimensions (for example, from 50 to 500 microns in diameter) to achieve the desired properties. Heretofore, many different techniques have been utilized to produce metallic powders. The simplest of these involves the mechanical comminution of solid stock by a mechanical cutter or grinder. This technique is capable of producing powder in large quantities. However, the powder is in the form of "chips" or "flakes" and is not generally spherical in configuration. Further, because of the contact between the cutter and the barstock being converted, it is sometimes difficult to ensure high purity in the resulting powder.

Another technique involves the preparation of metallic powders by chemical reduction of salts of the metal to be powdered. Again, the particles produced by such a process generally do not have the desired sphericity.

An especially useful technique for making powder is described in my earlier U.S. Pat. No. 3,099,041, issued July 30, 1963, and assigned to the assignee of the present invention. The process described therein forms generally spherical powders of various sizes and high purity by rapidly rotating a rod of the material to be processed inside a protective chamber and opposite an electrode through which current is supplied to the rod to thereby melt portions of it and cast off the melted droplets by centrifugal force. The chamber is flooded with inert gas to prevent contamination of the particles during their formation and has an access port through which the operator of the machine can reach the rod and replace it when it has been nearly fully consumed.

The rate at which powder can be produced in this process is limited by the frequent need to replace the consumable rods. The length of these rods is limited by the fact that the unsupported tip of the rod adjacent the electrode undergoes a high centrifugal acceleration when rotated. This acceleration tends to deflect the rod outwardly of its longitudinal axis, thereby imposing severe stresses on the rotating mechanisms and associated parts and interfering with the required arcing relationship between it and the stationary electrode. Thus, this process has been limited to use with rods of rather short length in relation to their thickness (for example, of the order of 10 inches in length and 2.5 inches in diameter in the case of a rod of steel). This imposes a severe limitation on the production rate.

A further limitation on the production rate is imposed by the fact that the consumable rods are changed from within the chamber itself. This restricts the operator to working within a confined area and necessitates his protection from the hot metallic parts within the chamber by means of bulky thermally insulated gloves and the like which further restricts the scope of his movements in replacing the consumable rod and lengthens the time required for replacement. An additional limitation is imposed by the fact that the chuck holding the rod is exposed to the molten metals and to the stationary electrode during the melting process and deteriorates in use, thus requiring frequent refitting.

SUMMARY OF THE INVENTION

Objects

Accordingly, it is an object of the invention to provide an improved powder-making process and apparatus enabling higher production rates than heretofore available.

Yet a further object of the invention is to provide an improved powder-making process and apparatus in which the consumable materials are loaded external to the chamber in which they are consumed.

Still a further object of the invention is to provide an improved powder-making process and apparatus in which the stock from which powder is to be made is rapidly loaded external to the chamber in which it is processed.

Another object of the invention is to provide an improved powder making process and apparatus in which only the material to be processed is exposed to the arcing electrode.

Yet another object of the invention is to provide a more economical and more efficient powder-making process and apparatus.

Brief Description of the Invention

In accordance with my invention, production quantities of pure, generally spherical powder are obtained by feeding an electrode in the form of a long bar of material from which powder is to be obtained (hereafter called a "consumable electrode") into a closed chamber through a sealed port and rapidly rotating the electrode while striking an arc between it and a second electrode. The second electrode may be a stationary electrode of a material such as tungsten which is consumed only slowly in comparison with the consumable electrode or it may comprise a rotating electrode which is a "mirror image" of the consumable electrode. When the two electrodes are brought opposite each other and supplied with current to form an arc between them, the consumable electrode melts and casts off liquid droplets by centrifugal force to form the desired powder.

In general, the bars processed in accordance with the present invention have a length to diameter ratio such that the frequency at which the bar is rotated in producing powder of a desired size distribution exceeds the frequency at which the tip of the bar would deviate from the longitudinal axis during rotation by an amount greater than the radius of the bar. This would impose severe strains on the rotating machinery and would make it difficult, if not impossible, to maintain an acceptable arc between the bar and the stationary electrode were the free end not restrained from eccentric rotation. This restraint is provided by extending the forward end of the consumable electrode only slightly into the chamber during its melting so that its tip is supported against eccentric rotation immediately adjacent the sealed port itself. As the consumable electrode is melted, it is continually axially translated toward the second electrode until only a small portion of it, extending through the sealed port between the exterior and interior of the chamber, remains unconsumed. At this point, the melting is halted, a second consumable electrode is axially aligned with the unmelted portion of the first consumable electrode external to the chamber, and the second electrode is then axially fed through the port into the chamber. The unconsumed portion of the first electrode then drops into the chamber and the forward end of the second electrode takes its place in the sealed port and opposite the stationary electrode. The second electrode is then prepared for melting.

Instead of dropping the unconsumed portion of electrode into the chamber, thereby necessitating its reprocessing for subsequent use, it may be joined to the second consumable electrode exterior to the chamber and the melting and spinning then resumed to consume it entirely. This will be especially advantageous when materials which are costly or expensive to process are being converted to powder.

The method and apparatus of the present invention allows rapid replacement of the consumable electrode. Further, since the electrode is replaced external to the chamber in which it is subsequently melted, the operator does not come into contact with any machine parts which are at elevated temperatures. This results in added safety for the operator. Further, it allows him to work unencumbered by heavy, awkward thermal insulation, such as asbestos gloves, etc. and therefore allows him to effectuate the changeover of electrodes rapidly and efficiently.

Additionally, changing the electrodes in this manner ensures that the seal in the port communicating between the exterior and interior of the chamber is maintained relatively intact during and after the changeover operation so that none of the inert gas from the interior of the chamber can leak out, nor can contaminants from the outside of the chamber be carried into the chamber. As a result, the inert gas is conserved and frequent purging of the chamber to ensure complete cleanliness is obviated. All these factors lead to a faster, more economical process for producing pure, generally spherical metallic powder in large quantities.

DETAILED DESCRIPTION OF THE INVENTION

The foregoing and other and further objects and features of the invention will be more readily understood on reference to the following detailed description of the invention in which.

Figure 1:
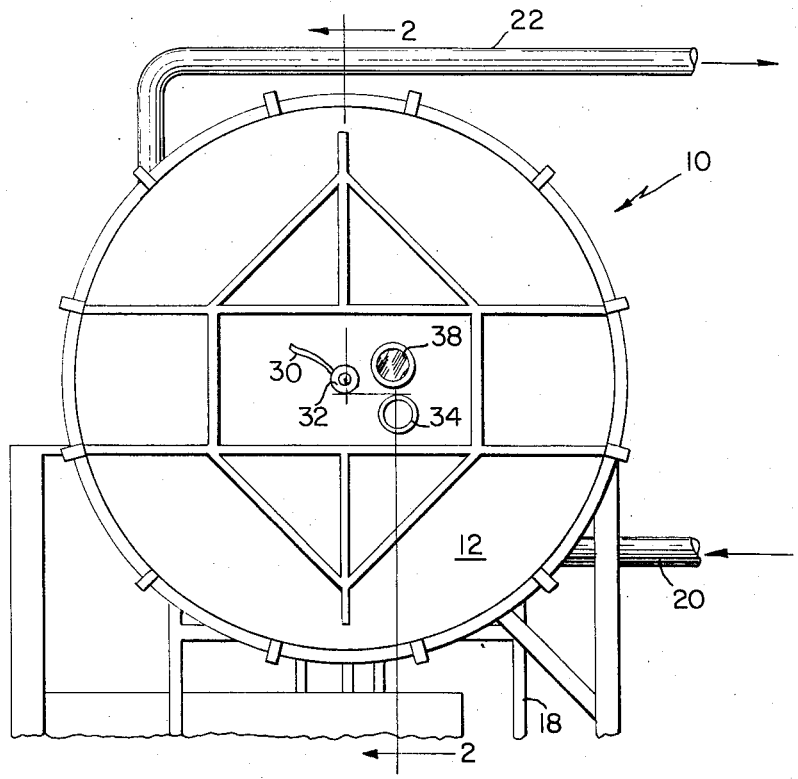
FIG. 1 is a front elevational view of a portion of the improved powder-making apparatus of the present invention.
Figure 2:
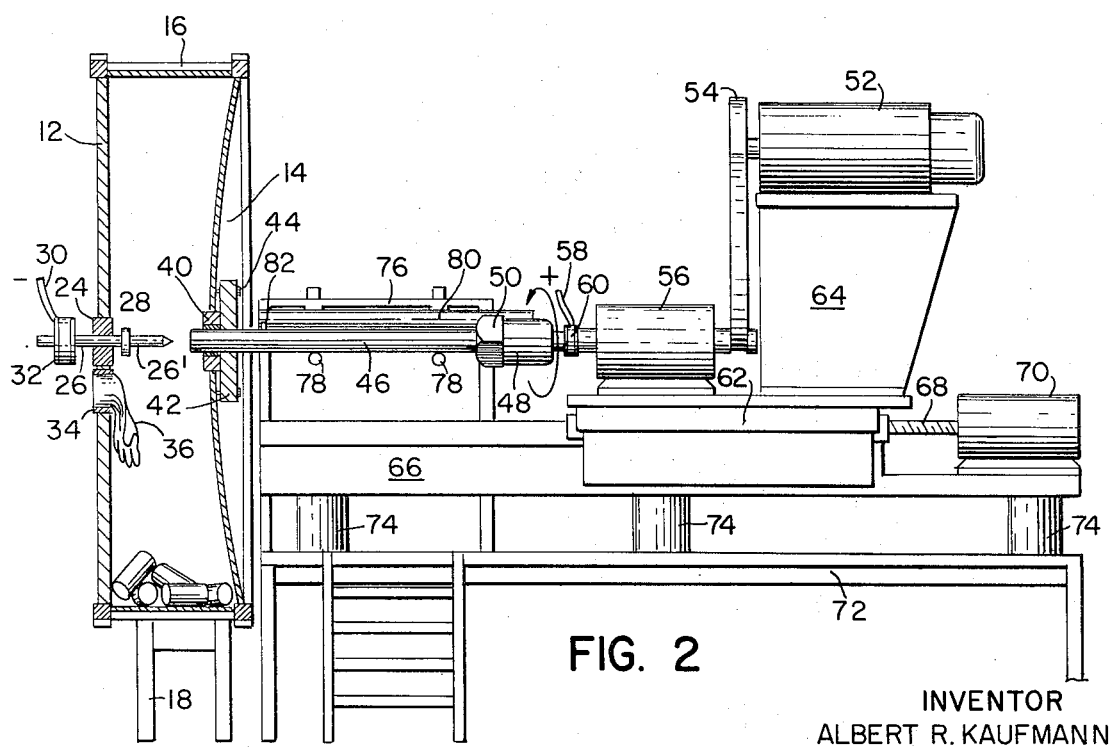
FIG. 2 is a side elevational view, partly in section, of the apparatus of the present invention taken along the lines 2—2 of FIG. 1 and showing a consumable bar positioned at the start of the powder-making operation.

In FIGS. 1 and 2, the powder-making apparatus of the present invention is shown as comprising a vertically oriented, gas tight chamber 10 having a front wall 12, a concave rear wall 14 inclined toward the front wall, and a side wall 16. A port (not shown) may be provided at the bottom of the chamber for removing powder and spent electrodes. The chamber 10 is supported by a truss 18. A gas inlet line 20 and exhaust line 22 continuously recycle inert gas through the chamber 10 to provide cooling to the metal particles formed during the powder-making operation and to maintain an inert atmosphere around the particles being formed to thereby maintain their purity. The gas is passed through a heat exchanger (not shown) to assist in cooling the molten particles.

A flexible, gas-tight seal 24 is formed in the front wall 12 of the chamber. An electrode 26 having a removable tip portion 26' mounted in a lockable collar 28 extends through a seal 24 into the interior of the chamber 10. The seal 24 allows the electrode 26 and tip 26' to be moved a greater or lesser distance into the chamber. A heavy electrical lead 30 is connected to the electrode 26 through a conductive clamp 32. The lead 30 is attached to the negative terminal of a high current power supply (not shown).

A second gas-tight seal 34 in the front wall 12 of the chamber has a thermally insulated glove 36 attached to it and extending into the chamber 10. The tip 26' of the electrode 26 may be changed by the operator when necessary with the aid of this glove. A sealed viewing port 38 is located adjacent the electrode 26 and the seal 34 to enable the operator to monitor the processing.

On the rear wall 14 is located a gas-tight seal 40. Adjacent the seal 40 is a dynamic rest 42 which is attached to the wall 14 by bolts 44. The seal 40 and rest 42 are shown in greater detail in FIGS. 5 and 6. One end of an extended bar 46 extends through the seal 40 and rest 42; the other end of this bar is clamped in a chuck 48 by means of a hex nut 50. The chuck 48 is connected to a motor 52 through a belt 54 and a gear box 56. A lead 58, connected to the chuck shaft through a brush 60, connects the bar 46 to the positive terminal of the high current power supply to which the terminal 30 is connected.

The gear box 56 rests directly on a table 62, while the motor 52 is supported from the table 62 by a support 64. The table 62 is driven horizontally toward the chamber 10 along a bed 66 through a lead screw 68; the latter is driven from a motor 70. The bed 66 is supported above a platform 72 by means of columns 74. A table 76 (shown more clearly in FIG. 4) has a pair of extendable arms 78 which are utilized to load the bar to be processed at the appropriate time; the table slants slightly from rear to front to allow gravity loading of bars. An additional bar 80 is positioned on the table and is prevented from moving by pins 82 and 84 which are retracted into the table at the appropriate time during the loading operation; this is seen more clearly in FIG. 4.

The motor 52 rapidly rotates the bar 46 through the gear box 56. As the bar rotates, an arc is struck between the tip 26' of the stationary electrode 26 and the end of the bar 46 nearest this tip, thus melting portions of the bar. The melted portions are cast off in the form of small droplets by the centrifugal forces generated by the rapidly rotating bar; these droplets assume a spherical shape in their flight through the chamber toward the chamber walls. The dimensions of the chamber are chosen to be sufficiently large in relation to the flight path of the droplets that they solidify prior to striking the chamber walls. Accordingly, these droplets retain their spherical shape.

The size of the particles is determined by the density of the material being processed, the rotational speed of the bar and its dismeter. The production rate is determined primarily by the length of the bar, the current level, and the feed rate. For example, a 50 percent yield of powder approximately 100 microns in diameter is readily formed from bar stock 2 ½ inches in diameter and 48 inches in length is rotated at speeds of the order of 13,000 rpm. The bar is advanced toward the stationary electrode at a rate of approximately 4 inches per minute. In general, the bars to be processed in the present invention will be in excess of 30 inches in length, 1 inch in diameter, and will be rotated at speeds of from about 5,000 to 15,000 rpm to yield powders ranging from a few microns to several thousand microns.

As the bar melts, it is continuously fed to the tip 26' of the electrode 26 by the motor 70 and lead screw 68 in order to maintain the bar in arcing relation with the tip 26'. Additional control of the spacing between the tip 26' and the bar 46 is provided by the machine operator who moves the electrode 26 inwardly or outwardly, as necessary, to control the melting.

Figure 3:
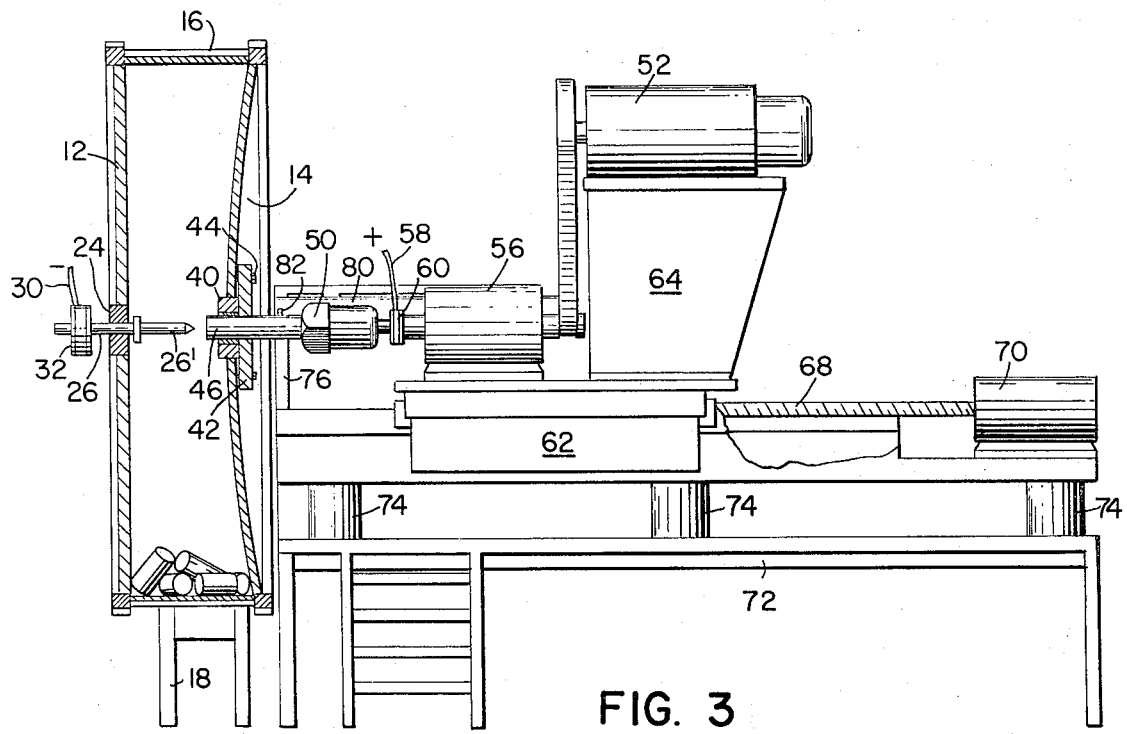
FIG. 3 shows the apparatus of the present invention toward the end of a cycle.
Figure 4:
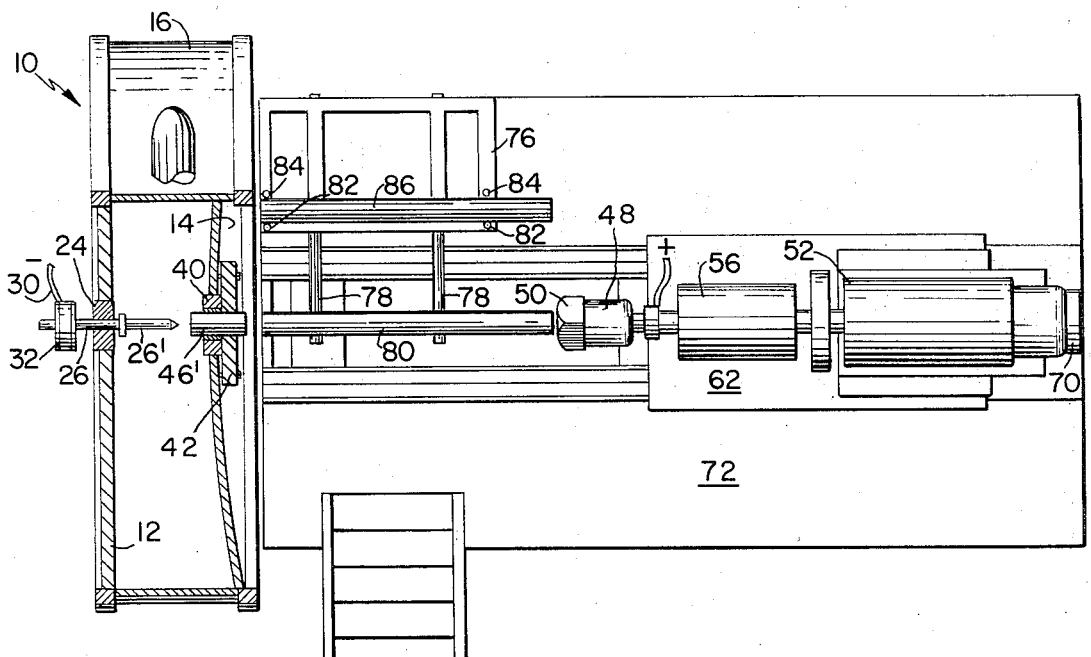
FIG. 4 is a plan view, with portions broken away, of the apparatus of the present invention in position for reloading a second bar to be processed.

FIG. 3 shows the apparatus of the present invention toward the end of a cycle, that is, with the bar 46 nearly fully consumed. In this position, the table 62 has advanced toward the chamber 10 to nearly its maximum extent. As long as there is sufficient clearance between hex nut 50 and the dynamic rest 42, the powder-making operation can continue. When, however, the table 62 advances sufficiently toward the chamber 10 that the hex nut 52 is brought immediately adjacent the rest 42, the operation is terminated, that is, the rotation of the bar 46 and its translation toward the electrode 26 are halted. At this point, only a short stub 46' (shown more clearly in FIG. 4) of the bar 46 remains unconsumed. This stub remains in the seal 40 while the hex nut 50 is loosened to remove the stub from the chuck 48. The platform is then backed off to its rightmost position as shown in FIG. 4 to allow for the loading of a new bar.

In order to load the new bar, the pins 82 on table 76 are dropped into the table to allow the bar 80 to swing onto the arms 78. These arms are then extended (for example, by an hydraulic actuator, not shown) so as to carry the bar 80 into a positioned aligned with the stub 46' and the chuck 48. At this time, the pins 84 may also be momentarily dropped to allow an additional bar 86 on the table 76 to roll into the position previously occupied by the bar 80. The bar 86 is then held in this position while the bar 80 is consumed.

When the bar 80 is aligned with the chuck 48, the table 62 is advanced toward the bar and the latter is pushed into the chuck. At this point, the operator securely locks the bar 80 into the chuck by means of the hex nut 50. The table 62 is then advanced toward the chamber 10. During this advance, the front end of the bar 80 contacts the stub 46' and pushes it toward the interior of the chamber 10 as the bar 80 advances through the rest 42 and seal 40 into the chamber 10. Tip 46' then falls to the bottom of the chamber for subsequent removal after a sufficient number of bars have been processed.

It will be noted that the seal 40 is continuously occupied either by the stub 46' or the bar 80 during the changeover operation. Accordingly, the integrity of the seal is maintained during the changeover and little or no gas escapes from the chamber at this time. Further, contamination from the environment is also sealed out and there is therefore no need to purge the chamber after the changeover.

Figure 5:
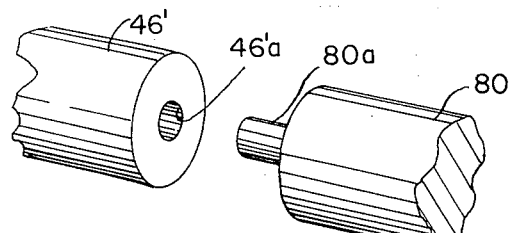
FIG. 5 is a view in perspective of a bar and stub illustrating a method of joining them for rotation.

As was noted previously, in many cases it will be found worthwhile to eliminate even the small amount of scrap represented by the stub 46'. This can readily be accomplished by joining the stub to the newly-loaded consumable electrode exterior to the chamber 10 and then resuming the powder-making process. The joining can take any of a variety of forms. For example, as shown in FIG. 5, the bar 46 may have a cylindrical bore 46'a in the stub end 46' which mates with a cylindrical protrusion 80a at the forward end of bar 80. The bore 46'a may be slightly undersized in parts so as to form a secure press fit with the protrusion 80a. A slot and key fitting or other fittings known to those skilled in the art, may also be used to secure the stub and bar together so that they remain integral during the melting. The stub and bar may alternatively be welded together by known techniques such as by friction welding or flash welding, among others. However, these joining techniques may distort the stub and bar and thereby introduce imbalance which may lead to difficulties when rotating the bar at high speeds.

It will be clear from the preceding that efficient operation of the apparatus described herein requires a seal that can withstand the high rotational speeds encountered during the operation of the apparatus and, additionally, requires an effective support adjacent the free end of the bar (that end not held in the chuck) to prevent unrestrained "whipping" or eccentric rotation which would quickly damage the seal as well as the rotating machinery. A seal and a dynamic rest, which I have found especially advantageous in accomplishing these ends, are shown in FIGS. 6 and 7 in which FIG. 6 is a side sectional view of a preferred embodiment of seal and a dynamic rest, and FIG. 7 is a view in perspective with portions broken away for clarity, of the dynamic rest of FIG. 6.

Figure 6:
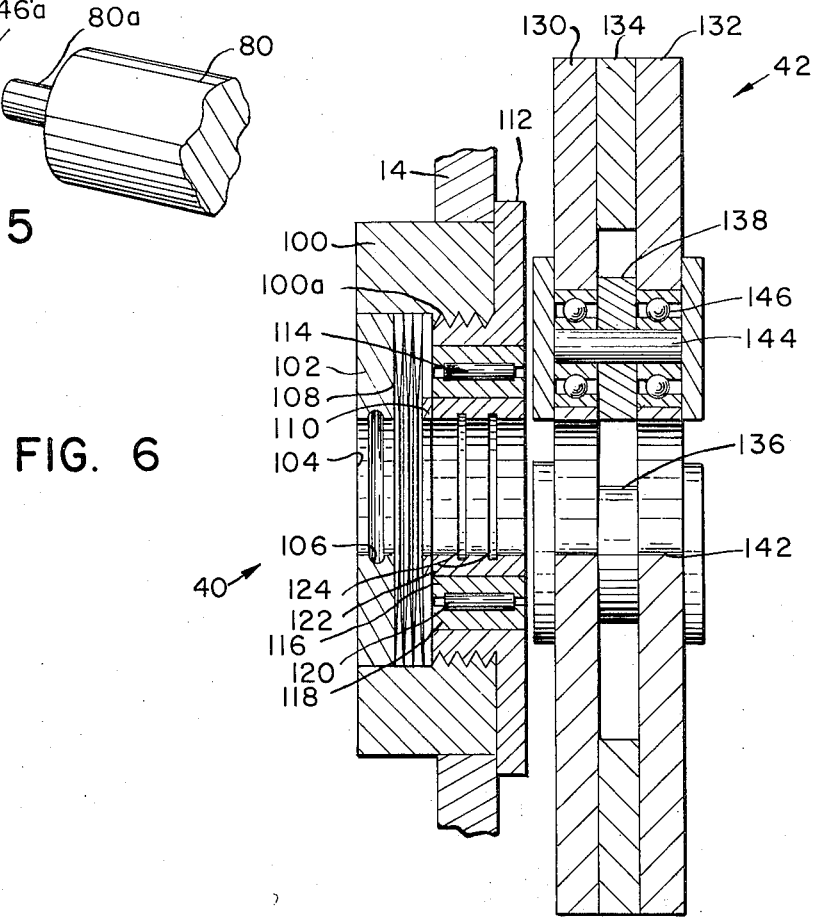
FIG. 6 is a side sectional view of the chamber seal and dynamic rest utilized in conjunction with the present invention.
Figure 7:
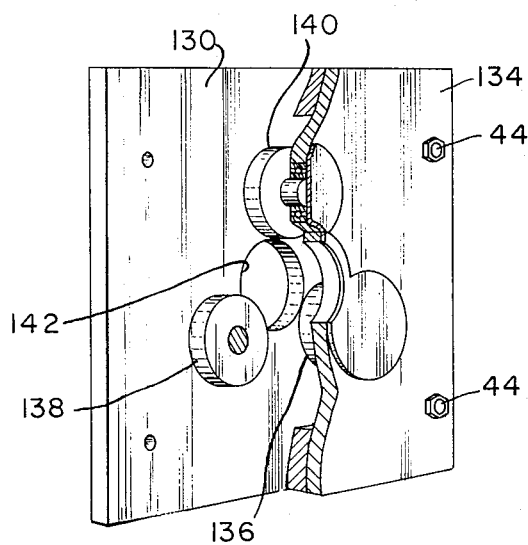
FIG. 7 is a view in perspective of the dynamic rest of FIG. 6.

In FIG. 6 the seal 40 has a threaded collar 100 which may be welded or otherwise attached to the frame 14. The collar 100 has a back plate 102 through which a cylindrical bore 104 extends; the bar 46 extends through this bore. The bore has a groove 106 for receiving a resilient O-ring which form a seal around the bar. A flexible cylindrical bellows 108 is interposed between the back plate 102 and a graphite ring 110. The bellows 108 and ring 110 have central apertures coincident with the bore 104. A flange 112 threaded into the collar 100 carries a bearing 114 having an inner race 116, an outer race 118 and a set of rollers 120. An inner collar 122 having a central aperture coincident with the bore 104 forms a press fit with the inner race 116 of the bearings 114. The collar 122 has circumferentially extending grooves 124 for receiving resilient O-rings which seal the clearance between the bar and the inner wall of collar 122.

The collar 122 rotates with the inner race 116 of the bearing 114. As these elements rotate, they press against the graphite ring 110 which is held in tension against them by means of the flexible bellows 108. As the face of the collar wears, the bellows continues to press it against the rotating component and thereby maintain a tight seal with these components. Since the ring 122 rotates with the bar extending through it, the O-rings placed in the grooves 124 are stationary with respect to the bar extending through them, and thus maintain a tight seal which does not degrade with time except for the slight wear caused by translation of the bar through them. Accordingly, any leakage of inert gas past the O-ring positioned in the groove 106 is effectively sealed off from communication with the exterior of the chamber by means of the seals formed in the graphite ring 110 and the O-rings in the grooves 124.

Since the high rotational speeds encountered herein (of the order of from 5,000 to 15,000 rpm) generate large transverse forces on the bar being processed, it is necessary to restrain the end of the bar not clamped in the chuck from whipping, while allowing it to rotate freely about its own axis. This is most readily accomplished by the dynamic rest shown in FIGS. 6 and 7. As shown therein, the rest 42 is formed from an inner plate 130 separated from an outer plate 132 by spacers 134. Rollers 136, 138 and 140 are positioned tangentially around the periphery of a central circular aperture 142; these rollers are symmetrically formed, and accordingly, one of them, the roller 138, will be described in detail. Roller 138 rotates with a shaft 144 in a set of bearings 146. The periphery of this bearing is tangential to the aperture 142 so that it forms essentially a line contact with the bar extending through the aperture to prevent the bar from "whipping" off its longitudinal axis in the direction of this bearing. The same is true of the bearings 136, 138 and 140, which also contact the bar 46 being fed through the aperture 142 and rotate with it. Accordingly, they prevent the bar from whipping outwardly from its longitudinal axis but allow rotation of the bar about this axis.

The lengths of the bars processed in accordance with the present invention are limited only by one's ability to form a relatively straight bar over the desired length and to properly support it during rotation. Because the bar is rotating at high speeds, it is necessary to minimize any eccentricity of the bar, since the eccentricity will become exagerated during rotation. If additional supports are provided between the chuck holding one end of the bar and the dynamic rest supporting the other end, however, the effects of these eccentricities will be minimized. These additional supports will also enable one to utilize bars of longer length than may be used when no such additional supports are provided. It is known that for a bar of a given stiffness, density, and diameter, the maximum speed at which it may be rotated in inversely proportional to the square of the distance between supports. By providing additional supports between the chuck and the dynamic rest, therefore, the length of bar that may be rotated at a given speed is increased. This, of course, increases the overall efficiency of the powder production process since the "down time" required for replacing the bar is thereby minimized.

The preferred embodiment of my invention as described in the foregoing utilizes an electric arc melting process for rapidly melting the consumable electrode. Electric arc melting is preferred since it is readily controllable and does not introduce contaminants into the powder as may occur, for example, in producing the powder with a hydrocarbon flame. However, it will be understood that my invention is not so limited and that other melting techniques may also be used in conjunction with the invention. For example, the electrode 26 may be replaced by an open flame torch, a plasma arc torch, or other means of inducing an energy flow into the consumable electrode or bar of sufficient intensity to melt portions of it during high speed rotation.

From the foregoing it will be seen that I have provided an improved powder making method and apparatus which enables the production of generally spherical, relatively pure metallic powders. The size of the powders produced in accordance with the invention may vary from several microns to thousands of microns dependent on the diameter of the stock being processed, the rotational speed of the stock, the material stiffness and density, among other factors. By selectively controlling these factors, the yield of particles of a given size range may be maximized.

It will also be seen from the foregoing that the method and apparatus of the present invention provide an efficient and economical manner in which to form high purity powders. The ability to rapidly load the materials to be processed external to the chamber enables the operator to maintain accelerated production rates. Further, it increases the safety of the operation since contact of the operator with the consumable electrode within the chamber is eliminated and also minimizes the necessity for internal access to the chamber, thereby reducing requirements for frequent purging of the chamber.

It will also be seen that I have provided a unique seal for sealing the port through which the consumable bar enters the chamber and have also provided efficient means for minimizing the rotational stresses on this seal, thereby prolonging seal life. Various changes and modifications of the invention may be made by those skilled in the art without departing from the spirit or scope of the invention and it is therefore intended that the foregoing material will be interpreted as illustrative only and not in a limiting sense.

Having described and illustrated a preferred embodiment of my invention,

I claim:

1. Apparatus for producing relatively pure, generally spherical metallic powder comprising:
   A. a chamber for maintaining a conrolled atmosphere therein,
   B. means introducing a first electrode into said chamber,
   C. a port communicating between the interior and exterior of said chamber and adapted to receive a second, rotating, consumable electrode extending therethrough, D. means external to said chamber for receiving one end of said second electrode therein and for rotating said electrode at a speed sufficient to cast off melted droplets therefrom, while simultaneously advancing said electrode into said chamber, and E. means for striking an electrical arc between said first electrode and the other end of said second electrode to thereby melt portions of said second electrode.

2. Apparatus according to claim 1 which includes means for restraining the eccentric rotation of said second electrode at a position adjacent said port whereby the load on said seal due to said rotation is minimized.

3. Apparatus according to claim 2 in which said second electrode is generally cylindrical in shape and is rotated along the major axis of said cylinder, and in which the means for restraining said eccentric rotation comprises a plurality of rotatable cylindrical plates circumferentially spaced apart from each other and in peripheral contact with said electrode adjacent said port.

4. Apparatus according to claim 1 in which said port includes a seal conformable to said second electrode for isolating the interior of said chamber from the exterior thereof.

5. Apparatus according to claim 4 in which said seal includes a first stationary collar, a rotatable collar mounted in said stationary collar and having an aperture for receiving said second electrode therethrough along a longitudinal axis thereof, the rotatable collar and the second electrode being rotatable with each other, a wearable low friction surface positioned in a plane normal to said longitudinal axis and abutting said rotary collar, and means for holding said low friction surface against said rotary collar to provide a seal therewith.

6. Apparatus according to claim 5 in which the aperture in rotatable collar is adapted to receive at least one resilient sealing element for sealing the clearance between the second electrode and the rotatable collar to thereby isolate the interior of the chamber from the exterior thereof.

7. Apparatus according to claim 1 which includes means to advance said second electrode toward said first electrode to thereby maintain said electrodes in arc supporting relation.

8. Apparatus according to claim 1 in which the means for receiving a second electrode therein comprises a chuck into which said electrode is releasably inserted and connected in driving relation with a motor for rotation thereby.

9. Apparatus according to claim 8 in which said chuck is mounted for translational motion toward said chamber at a controlled rate whereby said bar is simultaneously translated and rotated durig the powder-making operation.

10. Apparatus for producing powder from a bar of consumable material, comprising:

A. a chamber for maintaining a controlled atmosphere therein,

B. means introducing a nonconsumable electrode into said chamber,

C. a port in said chamber adapted to maintain a seal around a consumable electrode extending from the exterior of the chamber to the interior thereof along a longitudinal axis of said seal, D. means adjacent said seal for restraining a first end of the consumable electrode from eccentric rotation about said longitudinal axis, E. means external to said chamber for mounting a second end of the consumable electrode for rotation about said longitudinal axis at a speed sufficient to cast off melted droplets from the exterior of said electrode under the action of centrifugal force, the mounting means being positionable sufficiently far from the restraining means to accommodate therein an electrode having a length of the order of magnitude of the shortest critical length of the consumable electrode when rotated at the selected speed, F. means for translating the consumable electrode along the longitudinal axis of said seal and into said chamber at a controlled rate to thereby maintain the electrodes in arc-supporting relation.

11. Apparatus according to claim 10 in which the mounting means and the restraining means are positionable sufficiently far apart to accommodate a consumable electrode of at least 30 inches in length.

12. Apparatus according to claim 10 adapted to form powder of less than 500 microns in diameter from generally cylindrical bar stock at least 1.0 inches in diameter and 30 inches in length.

13. Apparatus for producing relatively pure, generally spherical metallic powder comprising:

A. a chamber for maintaining a controlled atmosphere therein;

B. means introducing a first energy source into said chamber;

C. a port communicating between the interior and exterior of said chamber and adapted to receive a rotating, consumable bar extending therethrough;

D. means external to said chamber for receiving one end of said bar therein and for rotating said bar at a speed sufficient to cast off melted droplets therefrom, and E. means for advancing said bar into said chamber at a controlled rate for maintaining said energy source and said bar in energy absorbing relation during rotation of said bar to thereby melt portions of said bar and cast them off in the form of spherical droplets by centrifugal force.

14. Apparatus according to claim 13 in which the bar is initially characterized by a length-to-diameter ratio such that the frequency at which the bar is rotated in producing powder is in excess of the frequency at which the bar, when supported only at one end thereof, would deviate from the longitudinal axis by an amount greater than the radius of the bar.

* * * * *